US011724320B2

(12) United States Patent
Ghinassi et al.

(10) Patent No.: US 11,724,320 B2
(45) Date of Patent: Aug. 15, 2023

(54) QUICK COUPLING UNIT FOR BAR LOADER CLAMPS

(71) Applicant: BUCCI AUTOMATIONS S.P.A., Faenza (IT)

(72) Inventors: Andrea Ghinassi, Faenza (IT); Marco Malucelli, Forli' (IT)

(73) Assignee: BUCCI AUTOMATIONS S.P.A., Faenza (IT)

( * ) Notice: Subject to any disclaimer, the term of this patent is extended or adjusted under 35 U.S.C. 154(b) by 539 days.

(21) Appl. No.: 16/628,988

(22) PCT Filed: Jul. 7, 2017

(86) PCT No.: PCT/IT2017/000138
§ 371 (c)(1),
(2) Date: Jan. 6, 2020

(87) PCT Pub. No.: WO2019/008608
PCT Pub. Date: Jan. 10, 2019

(65) Prior Publication Data
US 2020/0139449 A1    May 7, 2020

(51) Int. Cl.
*B23B 31/107* (2006.01)
*B23B 13/12* (2006.01)

(52) U.S. Cl.
CPC .......... *B23B 31/107* (2013.01); *B23B 13/123* (2013.01); *B23B 2260/02* (2013.01); *Y10T 279/17803* (2015.01)

(58) Field of Classification Search
CPC .............. B23B 31/107; B23B 2260/02; B23B 31/1612; B23B 31/16125;
(Continued)

(56) References Cited

U.S. PATENT DOCUMENTS 3,747,946 A * 7/1973 Edens ................... B23B 31/117
279/81
4,231,581 A * 11/1980 Benedict ............. B23B 31/1071
279/81
(Continued)

FOREIGN PATENT DOCUMENTS

CN         2531902 Y      1/2003
CN       101362217 A      2/2009
(Continued)

OTHER PUBLICATIONS

Machine Translation, JPH09300265A. (Year: 1997).*
(Continued)

*Primary Examiner* — Eric A. Gates
(74) *Attorney, Agent, or Firm* — Cantor Colburn LLP

(57) ABSTRACT

A quick coupling unit for bar loader clamps includes an end shaft that can be accommodated rotatably within a corresponding seat of a tubular body that is integral with the bar pusher of said loader and an element for stable coupling to the terminal stem of the respective clamp. The element includes a sleeve provided with a recess whose shape and dimensions are complementary to those of an insert which can be accommodated in said recess. The quick coupling unit also includes a locking ring having a variable inside diameter that surmounts said sleeve, the rotation of the ring to a first configuration defines clamping of the insert within the recess and locking of the stem, and to a second configuration defining radial freedom of the insert and free exit of the stem.

7 Claims, 3 Drawing Sheets

(58) Field of Classification Search
CPC ........ B23B 31/16129; B23B 31/10741; B23B 13/123; Y10T 279/17083; Y10T 279/17786; Y10T 279/17041; Y10T 279/17982; Y10T 403/60; Y10T 279/17803
See application file for complete search history.

(56) References Cited

U.S. PATENT DOCUMENTS

| | | | | |
|---|---|---|---|---|
| 4,708,548 | A | * | 11/1987 | Taylor ................. B23B 31/1071 279/81 |
| 5,577,743 | A | * | 11/1996 | Kanaan ................. B23B 31/223 279/81 |
| 8,286,971 | B2 | * | 10/2012 | Huang ................... B21D 28/34 279/81 |
| 2002/0003992 | A1 | * | 1/2002 | Omi ................... B23B 51/0473 279/81 |
| 2002/0083807 | A1 | | 7/2002 | Gascoyne |

FOREIGN PATENT DOCUMENTS

| | | |
|---|---|---|
| CN | 203843175 U | 9/2014 |
| CN | 203665475 U | 6/2015 |
| CN | 206028781 U | 3/2017 |
| DE | 20319290 U1 | 3/2004 |
| DE | 102012207651 A1 | 11/2013 |
| EP | 0037021 A1 | 10/1981 |
| EP | 1190796 A1 | 3/2002 |
| JP | H09300265 A | 11/1997 |
| JP | H10505550 A | 6/1998 |
| JP | 2006239798 A | 9/2006 |

OTHER PUBLICATIONS

International Search Report dated Apr. 10, 2018 re: Application No. PCT/IT2017/000138, pp. 1-4, citing: EP 1 190 796 A1, U.S. Pat. No. 3,747,946 A and DE 203 19 290 U1.

Written Opinion dated Apr. 10, 2018 re: Application No. PCT/IT2017/000138, pp. 1-6, citing: EP 1 190 796 A1.

JP Office Action dated Jul. 27, 2021 re: Application No. 2019-570051, pp. 1-3, citing: JP 2006-239798 A, JP H9300265 A, JP H10505550A and US 2002/0083807 A1.

English Translation of Brazilian Office Action for Brazilian Application No. 11 2019 027146 5, dated Apr. 4, 2023, 3 pages.

* cited by examiner

QUICK COUPLING UNIT FOR BAR LOADER CLAMPS

TECHNICAL FIELD

The present disclosure relates to a quick coupling unit for bar loader clamps.

BACKGROUND

Completely automated working of raw materials is now used to provide a considerable number of mechanical parts.

In particular, it is known to use automatic lathes which perform processes sequentially on the bars that they are fed.

Obviously, automation of the entire machining cycle depends on the correct and continuous supply of bars: for this reason, bar loaders are normally used which are designed to supply the bars to be machined to a lathe to which they are coupled.

Clearly, these loaders must provide the lathe with the bars on which the machinings are to be performed so they can rotate integrally with the spindle of the lathe, maintaining the ideal alignment thereof and avoiding any flexing (which might trigger vibrational phenomena which are detrimental to the quality of the machinings and to the lathe itself).

It is known to resort to clamps designed to retain the bars, provided with bar clamping means constituted by at least two jaws (or claws) which can be moved mutually closer until the bar is coupled.

Each type of clamp is normally dedicated to a specific type of bar to be machined and therefore it may be necessary to perform replacements of the clamp upon modifications of the shape and/or diameter of the bar to be machined.

Format changing operations provide for the removal of the clamp being used from the rotating assembly: a pin (or other coupling element) is normally interposed between the rotating assembly and the clamp and must be removed in order to be able to proceed with format changing.

The operator must therefore have specific tools and have the necessary skills to use them in order to perform the format changing operations.

SUMMARY

The aim of the present disclosure is to solve the problems described above, by proposing a quick coupling unit for bar loader clamps which allows the rapid replacement of the clamps coupled thereto.

Within this aim, the disclosure provides a quick coupling unit for bar loader clamps that allows to perform the format changing operations without the aid of tools.

The disclosure also provides a quick coupling unit for bar loader clamps that allows even nonexpert personnel to perform the changing operations.

The disclosure further provide a quick coupling unit for bar loader clamps of a different shape and type than known kinds.

The present disclosure provides a quick coupling unit for bar loader clamps that has modest costs, is relatively simple to provide in practice and is safe in application.

This aim and these advantages, as well as others which will become better apparent hereinafter, are achieved by providing a quick coupling unit for bar loader clamps, of the type comprising an end shaft that can be accommodated rotatably within a corresponding seat of a tubular body that is integral with the bar pusher of said loader and an element for stable coupling to the terminal stem of the respective clamp, characterized in that said element for stable coupling to the terminal stem of the respective clamp comprises a sleeve provided with a recess whose shape and dimensions are complementary to those of an insert which can be accommodated in said recess, the internal face of said insert having a shape which is complementary to that of a recess that is present on the terminal stem of the respective clamp, a locking ring surmounts said sleeve and said insert, said ring having a variable inside diameter, the rotations of said ring with respect to said sleeve being defined between a first configuration of alignment of a region having a minimum inside diameter with said insert, with consequent clamping of said insert within said recess and locking of said stem as a consequence of the insertion of the terminal face of said insert within said recess that is present on the terminal stem of the respective clamp, and a second configuration of alignment of a region having a maximum inside diameter with said insert and consequent freedom of radial spacing thereof from said recess, with consequent free exit of said stem provided with the recess from said sleeve.

BRIEF DESCRIPTION OF THE DRAWINGS

Further characteristics and advantages of the disclosure will become better apparent from the description of a preferred not exclusive embodiment of the quick coupling unit for bar loader clamps according to the disclosure, illustrated by way of nonlimiting example in the accompanying drawings, wherein.

DETAILED DESCRIPTION OF THE DRAWINGS

Figure 1:
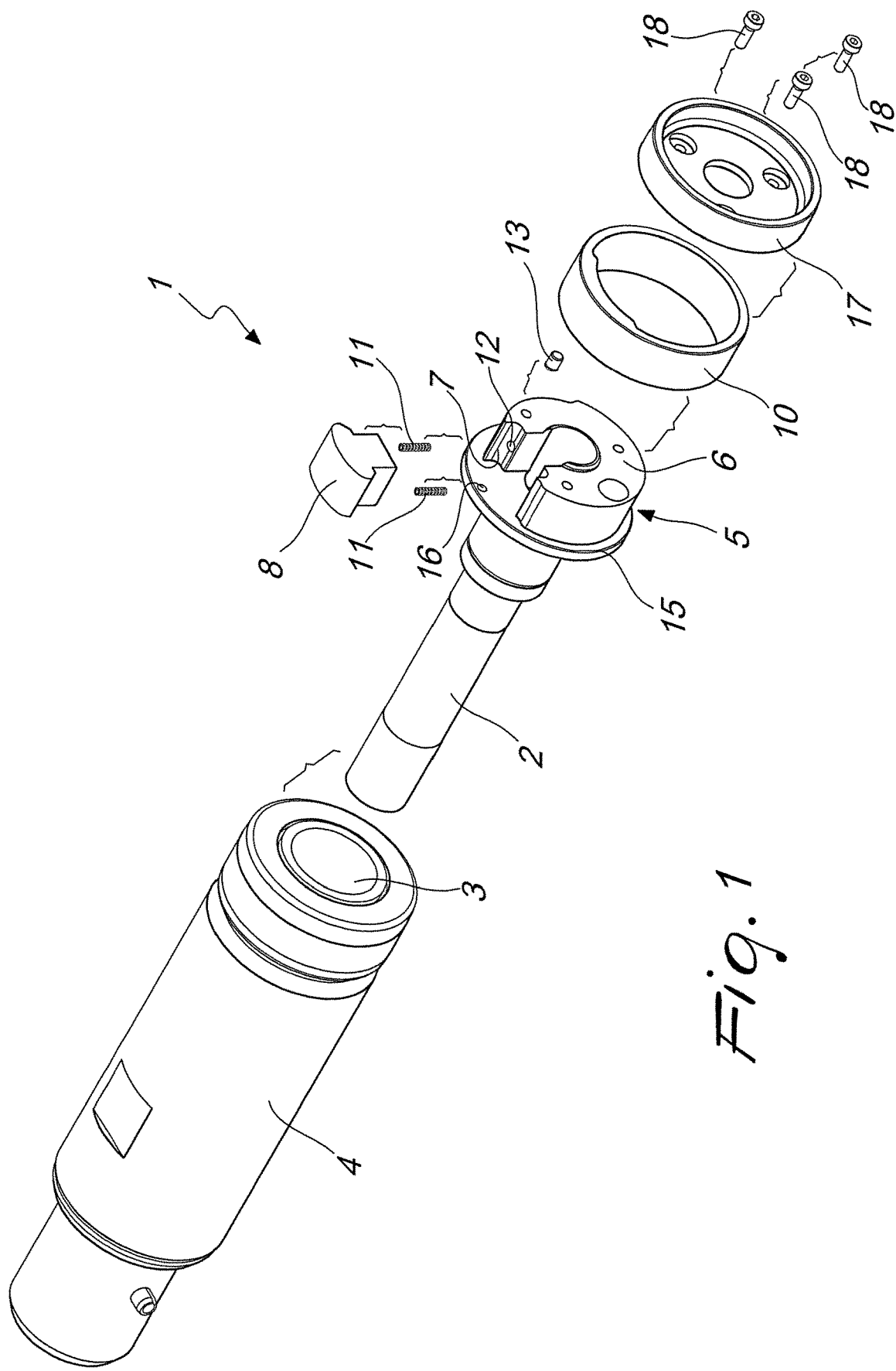
FIG. 1 is an exploded perspective view of a quick coupling unit for bar loader clamps according to the disclosure.
Figure 2:
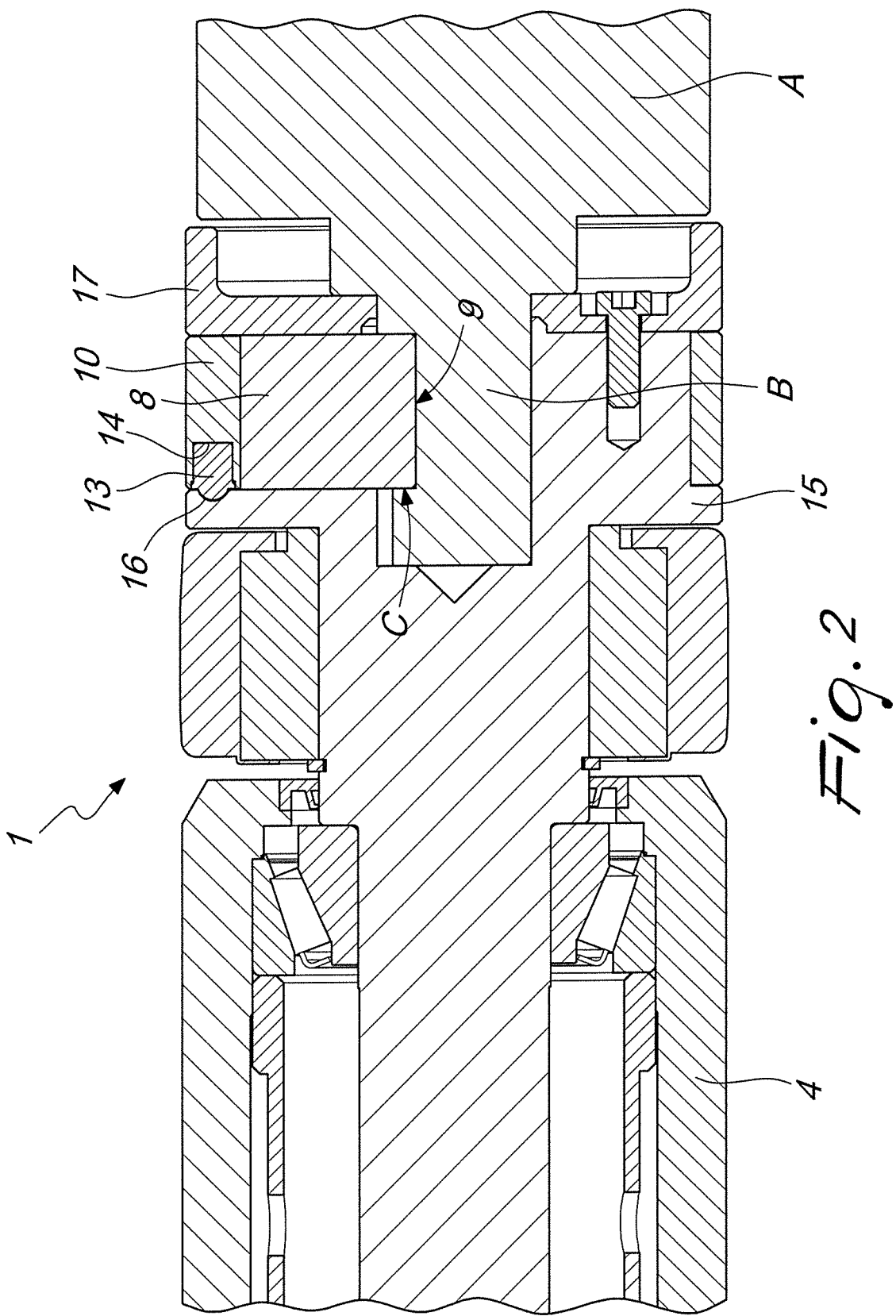
FIG. 2 is a sectional view, taken along a vertical axial plane, of the unit of FIG. 1.
Figure 3:
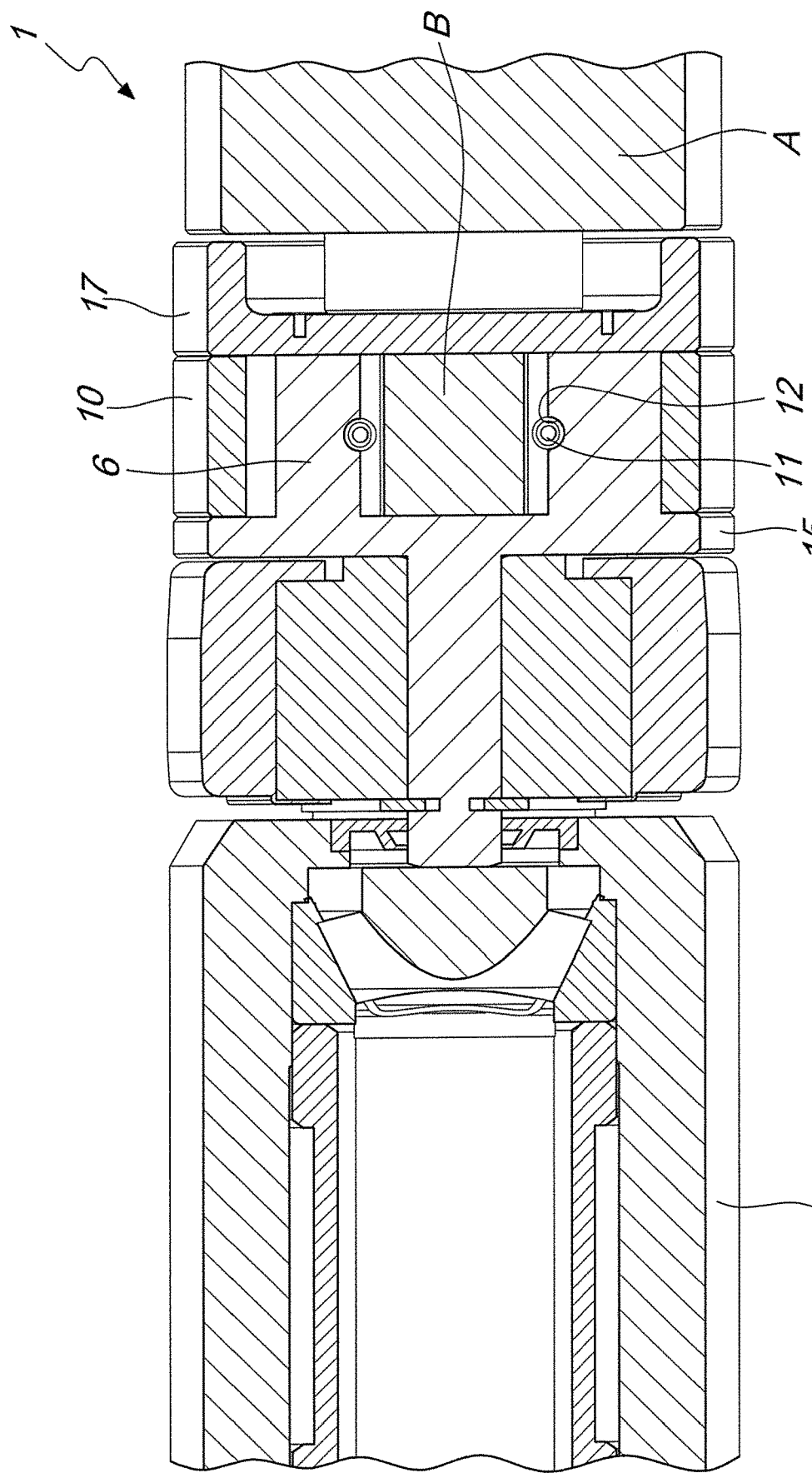
FIG. 3 is a sectional view, taken along a horizontal axial plane, of the unit of FIG. 1.

With particular reference to the figures above, the reference numeral 1 generally designates a quick coupling unit for bar loader clamps.

The quick coupling unit 1 according to the disclosure comprises an end shaft 2 which can be accommodated rotatably within a corresponding seat 3 of a tubular body 4 that is integral with the bar pusher of the loader and an element 5 for stable coupling to the terminal stem B of the respective clamp A.

The element 5 for stable coupling L to the terminal stem B of the respective clamp A comprises a sleeve 6 provided with a recess 7 whose shape and dimensions are complementary to those of an insert 8 that can be accommodated in the recess 7.

The internal face 9 of the insert 8 has a shape that is complementary to that of a recess C that is present on the terminal stem B of the respective clamp A.

A locking ring 10 surmounts the sleeve 6 and the insert 8.

The ring 10 has an inside diameter that is variable along its internal surface (producing progressive variations of its thickness).

The ring 10 can rotate and its rotations can be imposed manually by an operator.

The rotations of the ring 10 with respect to the sleeve 6 are defined between a first configuration and a second configuration.

The first configuration corresponds to the alignment of a region of the ring 10 having a minimum inside diameter (maximum thickness) with the insert 8, with consequent clamping of the insert 8 within the recess 7 and locking of the stem B following the insertion of the terminal face 9 of the insert 8 within the recess C that is present on the terminal stem B of the respective clamp A.

The second configuration of alignment of a region with maximum inside diameter (minimum thickness of the edge of the ring 10) with the insert 8 and consequent freedom of radial spacing thereof from the recess 7, with consequent free exit of the stem B provided with the recess C from the sleeve 6. At the second configuration of the ring 10 it is therefore possible to extract the clamp A that is present and replace it with a different one (for example for format changing operations).

It is fundamental to point out that the design and manufacture of the components must base the distribution of the masses of the various components involved in order to generate a perfect balancing of the rotating masses (suitable to return the center of gravity of the assembly on the rotation axis). A balanced rotating assembly does not introduce the triggering of vibrations on the rotating shaft, therefore on the clamp A and accordingly on the bar being machined.

According to a constructive solution of unquestionable interest in practice and in application, at least one elastic element 11 is interposed between the insert 8 and the recess 7 of the sleeve 6 in order to maintain the insert 8 in the second configuration of radial spacing thereof from the recess 7 in the absence of external clamping forces applied to the insert 8.

The at least one elastic element 11 can be constituted advantageously by a pair of springs 11 with axial action, which are accommodated within respective seats 12 that are present in portions of the recess 7; the springs 11 are suitable to abut against corresponding portions of the insert 8 in order to space it elastically from the recess 7.

It is specified that the insert 8, in a particularly efficient constructive version thereof, is substantially T-shaped, in which the upper portion is shaped externally like a circular arc, with a diameter that is similar to that of the sleeve 6, and has beveled lateral edges.

By virtue of this shape, when the insert 8 is fully accommodated within the recess 7, its circular arc-like external surface is arranged so as to be substantially continuous with the circumference of the external surface of the sleeve 6.

In order to facilitate the easier and stable grip and the manual movement (rotation) of the ring 10, the respective external surface has a predefined roughness.

In particular, rings 10 can be provided with an external surface that is knurled, embossed, fluted, stippled or variously shaped in order to facilitate the grip of the operator assigned to format changing and/or maintenance (as will become apparent hereinafter, other components also may have such surface characteristics in order to facilitate stable grip on the part of the operator).

It is in fact essential that the operator can work without the aid of tools to speed up and simplify the operations that he must perform.

Furthermore, it is specified that the ring 10 can comprise conveniently a spring-loaded presser 13, which is mounted by interference in a respective slot 14 of the surface of the edge of the ring 10 that faces and is proximate, in the assembled configuration, to a frame 15 which protrudes with respect to the sleeve 6 of the stable coupling element 5.

The frame 15 comprises a recess 16 whose shape and dimensions are complementary to those of the front of the spring-loaded presser 13.

In the configuration for alignment of the presser 13 with the recess 16, the front of the presser 13 is validly at least partially accommodated within the recess 16, with consequent locking of the rotation of the ring 10 with respect to the stable coupling elements 5. Only upon the application of a force in the direction rotation (a moment) of high intensity on the ring 10 (which is applied by the operator by gripping the ring with his hand) is it possible to release the rotation of the ring 10 and move it to the second configuration, which allows the extraction of the clamp A (in particular it frees the stem B thereof).

It is appropriate to specify that the slot 14 that accommodates the spring-loaded presser 13 can be arranged advantageously in the region of maximum thickness of the ring 10.

In greater detail, the region of maximum thickness of the ring 10 is the region with minimum inside diameter which, in alignment with the insert 8, locks it within the respective recess 7 with the insertion of the terminal face 9 of the insert 8 within the recess C that is present on the terminal stem B of the respective clamp A.

With reference to a particularly functional constructive version, the unit 1 can further positively comprise a closure plate 17, which is interposed between the locking ring 10 and the clamp A to be coupled to the sleeve 6.

The plate 17 forms a shoulder for the ring 10 with consequent elimination of a degree of freedom of axial translational motion thereof. In practice, the plate 17 prevents the ring from being able to slide axially off the unit 1 (a possibility which would lead to the uncoupling of the insert 8 from the recess 7).

In order to ensure its correct stability, the plate 17 is coupled stably to the terminal front of the sleeve 6 by means of components such as screws 18, nails, rivets, and the like.

Furthermore, the plate 17 facilitates the operator in changing the clamp A, offering a greater grip surface, which is required to allow the relative rotation between the locking ring 10 and the sleeve 6.

The plate 17 can have an external surface which is knurled, embossed or otherwise variously shaped in order to facilitate the grip of an operator.

The present disclosure extends its protection also to a lathe bar loader, of the type comprising at least one bar pusher, which is coupled to a rotating assembly which supports a bar locking clamp A.

The rotating assembly in turn comprises a coupling unit 1 which is provided with an end shaft 2 that can be accommodated rotatably within a corresponding seat 3 of a tubular body 4 which is integral with the bar pusher of the loader and an element 5 for stable coupling to the terminal stem B of the respective clamp A.

The stable coupling element 5 of the lathe loader according to the disclosure comprises a sleeve 6 provided with a recess 7 whose shape and dimensions are complementary to those of an insert 8 that can be accommodated in the recess 7.

The internal face of the insert 8 has a shape that is complementary to the shape of a recess C that is present on the terminal stem B of the respective clamp A.

Furthermore, the coupling element comprises a locking ring 10 which surmounts the sleeve 6 and the insert 8.

The ring 10 has a variable inside diameter and its rotations with respect to the sleeve 6 allow to define two distinct configurations: a first configuration and a second configuration, which have already been defined in the description of the preceding pages.

The loader according to the disclosure can therefore comprise a unit 1 according to any one of the variations described so far (and/or any combination thereof).

Advantageously, the present disclosure solves the problems described previously, proposing a quick coupling unit 1 for bar loader clamps A that allows the rapid replacement of the clamps A coupled thereto.

Positively, the quick coupling unit 1 according to the disclosure allows to perform the format changing operations without the aid of tools: the ring 10 can in fact be rotated easily manually by an operator.

Favorably, the quick coupling unit 1 according to the disclosure allows even nonexpert personnel to perform changing operations.

Advantageously, the quick coupling unit 1 according to the disclosure is embodied with a shape and a type that is different from those of the known kind.

Validly, the quick coupling unit 1 according to an disclosure is relatively simple to provide in practice and has modest costs: these characteristics render the unit 1 according to the disclosure an innovation of assured application.

The disclosure thus conceived is susceptible of numerous modifications and variations, all of which are within the scope of the appended claims; all the details may further be replaced with other technically equivalent elements.

In the exemplary embodiments that follow, individual characteristics, given in relation to specific examples, may actually be interchanged with other different characteristics that exist in other exemplary embodiments.

In practice, the materials used, as well as the dimensions, may be any according to the requirements and the state of the art.

The invention claimed is:

1. A quick coupling unit for bar loader clamps, the unit comprising:
   an end shaft configured to be accommodated rotatably within a corresponding seat of a tubular body that is integral with a bar pusher of said loader and an element for stable coupling to a terminal stem of a respective clamp, wherein said element for stable coupling to the terminal stem of the respective clamp comprises a sleeve provided with a single central recess having shape and dimensions that are complementary to shape and dimensions of an insert configured to be accommodated in said recess;
   an internal face of said insert having a shape which is complementary to that of a stem recess that is present on the terminal stem of the respective clamp; and
   a locking ring surmounting said sleeve and said insert, said ring having a variable inside diameter, rotations of said ring with respect to said sleeve being defined between a first configuration of alignment of a region having a minimum inside diameter with said insert, with consequent clamping of said insert within said recess and locking of said stem as a consequence of the insertion of the internal face of said insert within said stem recess that is present on the terminal stem of the respective clamp, and a second configuration of alignment of a region having a maximum inside diameter with said insert and consequent freedom of radial spacing thereof from said recess of the sleeve, with consequent free exit of said stem provided with the stem recess from said sleeve, wherein said ring comprises a spring-loaded presser mounted in a slot, one end of the presser is in interference with a frame when there is relative circumferential movement between the presser and the frame, in the assembled configuration, said frame protrudes with respect to said sleeve of said stable coupling element, said frame comprising a recess having shape and dimensions that are complementary to those of a front of said spring-loaded presser, in the configuration of alignment of said presser with said recess of the frame the front of said presser being at least partially accommodated within the recess, with consequent locking of the rotation of said ring with respect to said stable coupling element, at least one elastic element being interposed between said insert and said recess of said sleeve to keep said insert in said second configuration of radial spacing from said recess of the sleeve in the absence of external clamping forces applied to said insert.

2. The unit according to claim 1, wherein said insert is substantially T-shaped, and wherein an upper portion is externally circular-arc shaped, with a diameter that is similar to that of said sleeve, and is provided with beveled lateral edges.

3. The unit according to claim 1, wherein the external surface of said locking ring, which surmounts said sleeve and said insert, has a predefined roughness.

4. The unit according to claim 1, wherein the slot for accommodating said spring-loaded presser is arranged in the region of maximum thickness of said ring, i.e., said region with minimum inside diameter, which, in alignment with said insert, locks said insert within said recess with the insertion of a terminal face of said insert within said stem recess that is present on the terminal stem of the respective clamp.

5. The unit according to claim 1, comprising a closure plate interposed between the locking ring and the clamp to be coupled to the sleeve, which forms a shoulder for said ring with consequent elimination of a respective degree of freedom of axial translational motion for said ring.

6. The unit according to claim 5, wherein said plate is coupled to a terminal front of said sleeve with at least one component.

7. A lathe bar loader comprising:
   at least one bar pusher coupled to a rotating assembly which supports a locking clamp for a bar, said rotating assembly comprising a coupling unit provided with an end shaft that can be accommodated rotatably within a corresponding seat of a tubular body that is integral with the bar pusher of said loader and an element for stable coupling to a terminal stem of the respective locking clamp, wherein said element for stable coupling to the terminal front of the respective clamp comprises a sleeve provided with a recess whose shape and dimensions are complementary to those of an insert that can be accommodated in said recess;
   an internal face of said insert has a shape which is complementary to that of a stem recess that is present on the terminal stem of the respective clamp; and
   a locking ring surmounts said sleeve and said insert, said ring having a variable inside diameter, the rotations of said ring with respect to said sleeve being defined between a first configuration of alignment of a region having a minimum inside diameter with said insert, with consequent clamping of said insert within said recess of the sleeve and locking of said stem following the insertion of the internal face of said insert within said stem recess that is present on the terminal stem of the respective clamp, and a second configuration of alignment of a region with maximum inside diameter with said insert and consequent freedom of radial spacing thereof from said recess, with consequent free exit of said stem provided with the stem recess from said sleeve, wherein said coupling unit is provided according to claim 1.

* * * * *